JOHN M. HUNT
LAURENCE E. FOGARTY
HAROLD S. HEMSTREET
PAUL J. MAILHOT
LEIPER P. READ
INVENTORS

BY Darby + Darby
ATTORNEYS

United States Patent Office 3,007,258
Patented Nov. 7, 1961

3,007,258
FORCE SIMULATION
Harold S. Hemstreet, Laurence E. Fogarty, and Paul J. Mailhot, Binghamton, Leiper P. Read, Whitney Point, and John M. Hunt, Binghamton, N.Y., assignors to General Precision Inc., a corporation of Delaware
Filed Nov. 7, 1956, Ser. No. 620,851
6 Claims. (Cl. 35—12)

This invention relates to apparatus for generating forces which are accurately proportional to the magnitude of electrical control signals, and more specifically to devices for the generation of artificial control forces to be applied to the controls (such as stick or wheel, rudder pedals, etc.) of a synthetic flight trainer. In modern grounded aircraft training systems it is acknowledged that faithfulness of simulation is required for adequate training, particularly for training persons to operate recent aircraft of increasingly high performance. It is also acknowledged that pilot familiarity with particular aircraft is based to a considerable degree upon recognition of both the static and dynamic control forces which the pilot must apply to the aircraft controls in order to perform various maneuvers. Shortcomings in the "control loading" apparatus associated with a flight simulator may have an adverse effect upon the simulator flying qualities, with a resultant material decrease in the validity of training. One who builds an artificial control loading device is confronted with the problem of providing a force-generating system of considerable force capability which must have a realistically smooth "feel" and have extremely small friction, except for the small amount of friction present in the actual aircraft system. Very small amounts of aileron or elevator friction may cause serious difficulty in maintaining an aircraft trimmed in flight, particularly at high speeds. A further severe problem is the generation of large forces without attendant risk of control unit damage through overload or overheating. If the artificial control force system is employed as a portion of an autopilot or other closed-loop control system, it is mandatory that the device meet certain dynamic requirements associated with the overall stability of the complete autopilot system. Modern high standards of simulation require that the control loading unit be capable of generating non-linear force versus displacement curves, break-away forces or detent effects (corresponding to similar effects deliberately introduced into aircraft control systems), and limiting of stick travel as the result of limiting aerodynamic hinge moments or reduced hydraulic system capabilities during emergency operation.

Most artificial control force systems of the prior art are little more than linear springs of controllable spring constant. This spring constant is varied as a function of dynamic pressure or similar aerodynamic parameters, with a resultant change in force gradient versus displacement characteristics. Some systems of the prior art actually employ a spring with a servo-driven variable mechanical linkage. Other systems well known in the prior art achieve equivalent results through the use of pneumatic elements, stalled electric motors, or magnetic power clutches. These systems all suffer from one or more of the following disadvantages:

(a) Excessive friction.
(b) Unrealistic machine-like "feel" resulting from gear-cogging or other mechanical defects.
(c) Vulnerability to damage through overheating if prolonged large control forces must be generated.
(d) Dynamic response inadequate for the use in auto-pilot systems or for the intrduction of bob-weight or aerodynamic trailing effects.
(e) Unsuitability to introduction of non-linear force displacement effects.
(f) Unsuitability to direct incorporation of snubbing or limiting effects arising from the relationship between simulated hydraulic pressure and aerodynamic hinge moments on power actuated systems.
(g) Quantitative errors in the stick force versus displacement relationships.

A further disadvantage of these older systems is that of inflexibility of design. Because of certain inherent shortcomings in these basically simple systems of the prior art, it is not feasible to introduce certain effects through purely electronic means, particularly if such systems are employed with flight simulators utilizing alternating current computation. Whereas most simulators of the prior art were constructed from tried and proven performance data derived from aircraft which had been built and flown, many contemporary flight simulators are constructed simultaneously with construction of the prototype aircraft, utilizing wind tunnel and calculated data in order to build the simulator. Since many design changes are ordinarily made as aircraft design progresses, it is often necessary to change simulator design to make it conform to that of the aircraft. Since most prior art control loading systems unfortunately suffer from the inflexibility of mechanical design, a relatively modest change in the design of an aircraft control system, or a change in aerodynamic data brought to light as the result of an extensive flight test program may necessitate extremely expensive re-design of the inflexible mechanical force simulating systems of the prior art.

In flight simulator control loading systems, it is necessary to generate forces on the control proportional, among other factors, to such variables as control displacement, control trim position, aerodynamic parameters, autopilot forces, etc. In artificial force-producing devices, a large variety of factors determine the magnitude of force in existence at a particular instant on the control. Utilizing the present invention the required force can be generated by various transducer equipment or through electronic computation as a voltage representing the desired instantaneous magnitude of control force through circuitry which is usually simple and economical to build, if modern electronic techniques are utilized. In general, the various non-linearities and the rigid dynamic requirements may be met without difficulty through electronic circuitry, while the use of mechanical elements of the systems of the prior art to accomplish these purposes may very well prove to be nearly impossible. A primary feature of the invention described herein is the conversion of the readily-attainable control force command voltage into a precision-controlled force which is an extremely faithful replica of the voltage representing a desired force.

Generally desscribed, the invention may be said to include a control upon which the desired force is to be generated, with the control being attached through a force-measuring element in direct linkage to a bi-directional force-producing means such as a hydraulic ram. The force-measuring element will comprise a transducer which converts translational force to voltage. A command input signal commensurate with the force desired is derived and compared with the output of the transducer, and the difference between the two signals is amplified in a high-gain servo loop to control the force-producing means. The invention includes a variety of features by means of which the desired force signal is realistically provided under varying conditions of simulated flight. That very many features of the invention are applicable to the simulation of machines other than aircraft will become obvious to those skilled in the art as the description proceeds.

It is therefore a primary object of the invention to provide improved means for applying forces on manually-operated control.

It is another object of the invention to provide improved control loading apparatus for use with aircraft flight trainers and like devices.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which.

Figure 5:
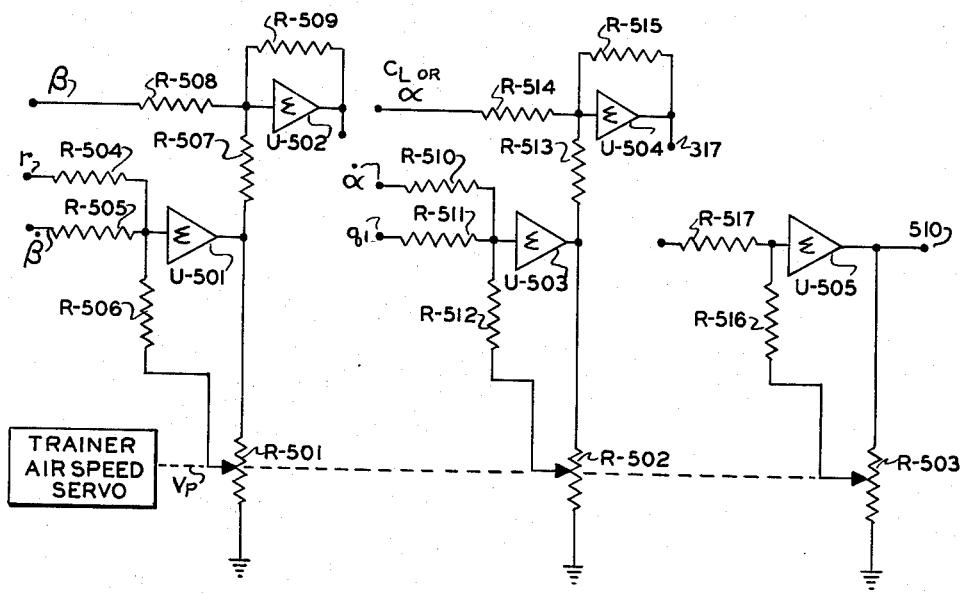
Figure 4:
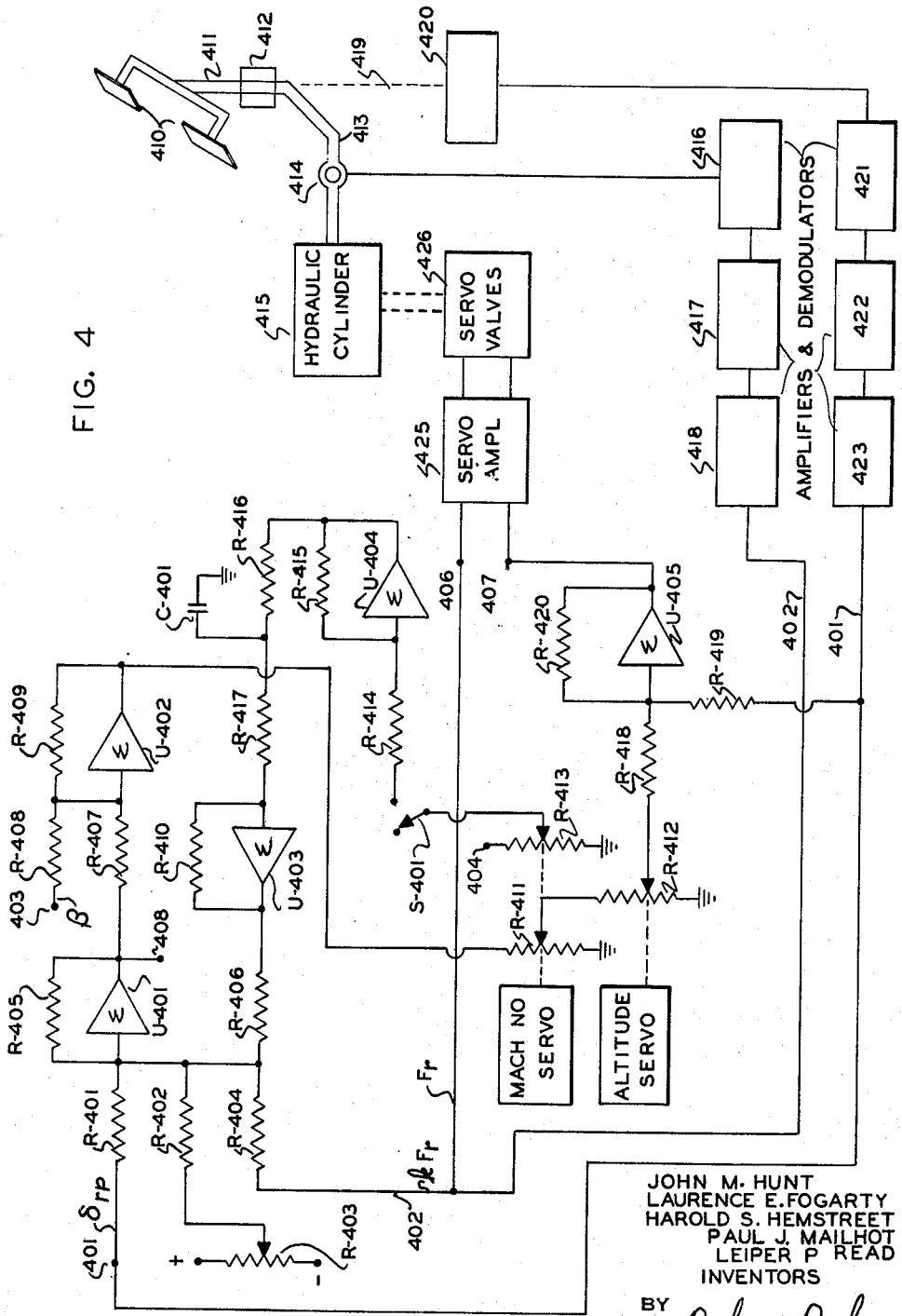

FIG. 4 is a schematic diagram of an exemplary embodiment of the invention, illustrating how the invention may be applied to simulate rudder control operation; and FIG. 5 is an electrical schematic diagram illustrating computer apparatus which may be used, if desired, with various embodiments of the invention to provide more accurate simulation of the forces on various simulated aircraft surfaces during various conditions of simulated flight. In various of the figures, certain parts are shown in block form for sake of clarity.

Figure 1:
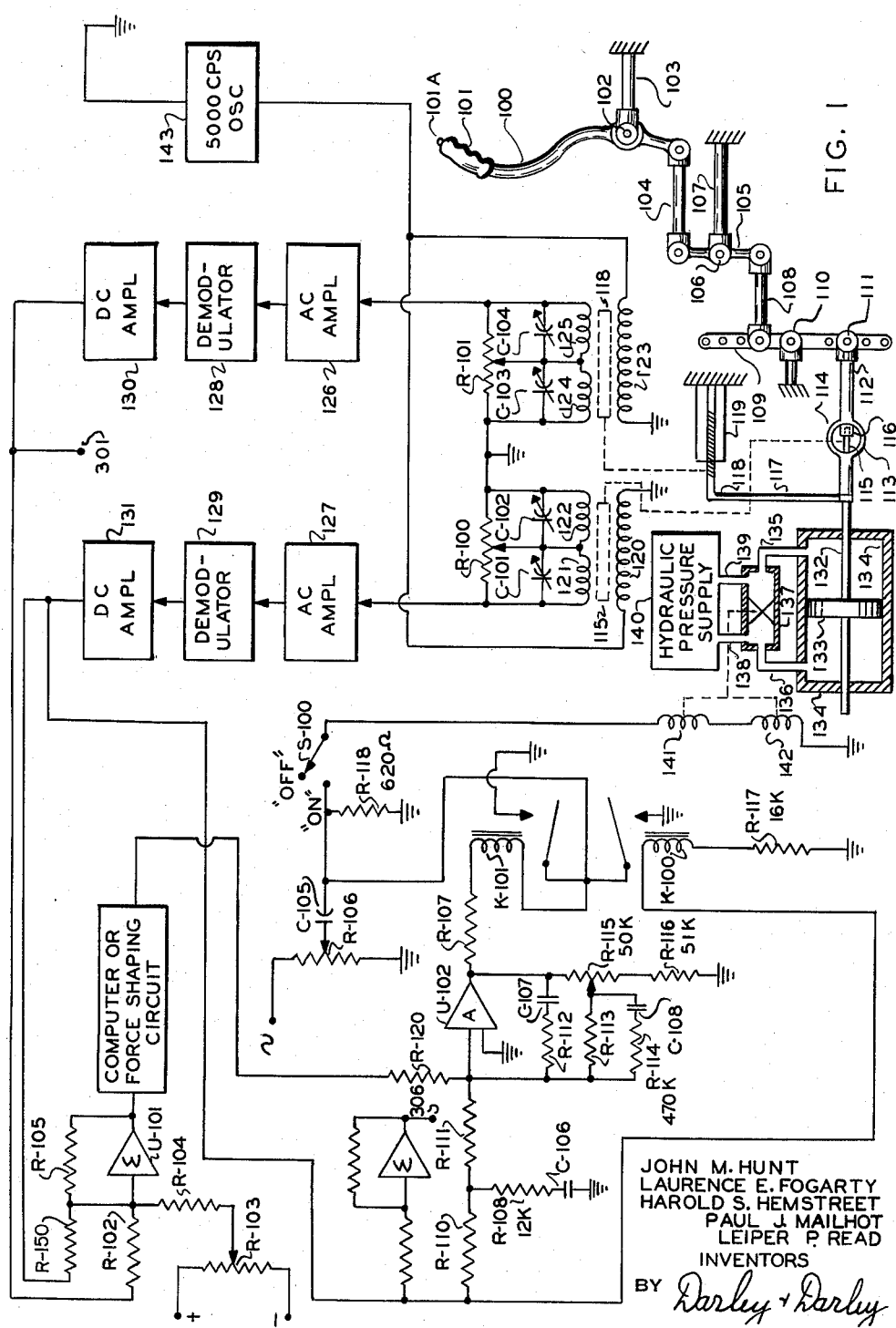
FIG. 1 is a schematic diagram illustrating an exemplary portion of the invention as applied to an aircraft flight simulator for applying forces to the stick of such a machine to simulate those forces which are present at the stick of an actual aircraft during various flight conditions.

Referring to FIG. 1 there is shown in schematic form an exemplary embodiment of the invention utilized to apply forces to the stick or control column of a conventional simulator to resist elevator operation of the control. Stick 100 is provided with a grip 101 at its upper extremity. Left-right movement of grip 101 as seen in FIG. 1 pivots stick 100 about pivot 102, which pivot is fixedly attached to the trainer cockpit by means 103. Transverse movement of link 104 upon movement of the simulated elevator control is mechanically transmitted through intermediate linkages 105, 108 and 109 about pivots 106, 110 and 111 so as to tend to move arm 112, which arm comprises a fixed mechanical connection to providing ring 114. Pivot 106 is mounted upon the end of rigidly secured rod 107. Hydraulic cylinder 134 is provided with a movable piston 133, and forces applied to piston 133 from admission and expulsion of fluid to cylinder 134 are transmitted by connecting rod 132 to proving ring 114, having an outer surface 113. Proving ring 114 acts as a very strong spring, so that forces applied to the ring by piston 133 and stick 100 serve to collapse or expand the ring in very small amounts. Proving ring 114 is of sufficient size and rigidity that the greatest force which the student is capable of applying to the right causes substantially undiscernible movement of the stick due to collapse or expansion of the ring. Otherwise explained, if rod 132 were locked in a given position, the deformation of ring 114 upon application of the pilot's maximum force would result in substantially unnoticeable movement of stick 100 at grip 101. Carried within proving ring 114 is a differential transformer 116 having a movable core 115 mounted on the opposite side of the ring, so that the deformation of ring 114 upon application of forces causes movement of core 115 relative to the windings of differential transformer 116. For sake of clarity, the core 115 and windings 120, 121 and 122 of the transformer are shown detached in FIG. 1.

An alternating voltage from a power supply 143 excites primary winding 120 of the transformer, and core 115 provides magnetic paths to link the primary winding flux with secondary windings 121 and 122. With core 115 centered in the transformer equal voltages are induced in windings 121 and 122. These windings are connected in opposition across potentiometer R–100, so that with core 115 centered no voltage is developed across potentiometer R–100. The common terminal between the secondary windings is connected to the adjustable wiper of potentiometer R–100 so that small voltages due to minute differences in the secondary windings may be cancelled out. Adjustment of potentiometer R–100 allows compensation for any small difference in magnitude between the voltages in windings 121 and 122 when the control stick is centered, and capacitors C–101 and C–102 are provided to compensate for phase shift in the induced voltages due to the inductance of differential transformer 116. Core 115 is mounted in proving ring 114 so that it is centered with respect to the secondary windings when no force is being applied to the proving ring. As proving ring 114 is deformed by the application of a tension or compression force increased voltage will be induced in one secondary winding and decreased voltage induced in the other secondary winding, causing a net or resultant voltage to appear across potentiometer R–100. The phase or "alternating polarity" of the resultant voltage will depend upon whether tension or compression has been applied to ring 114. Since the maximum deformation of ring 114 is not itself discernible to the student, differential transformer 114 must be capable of providing usable output voltages from very small movements of core 115. Numerous suitable differential transformers are commercially available. It is desirable that the output voltage versus core displacement of the transformer be linear. It may be understood from the above that proving ring 114 and differential transformer 116 together comprise a force-to-electrical signal transducer, which is an important characteristic of the invention. It should be noted that the output voltage across R–100 is determined solely by the *force* acting on proving ring 114 and not by stick *position*, except insofar as stick position will affect indirectly the force applied to ring 114 by piston 133, as hereinafter described.

Rigidly connected by arm 117 to the same end of proving ring 114 as piston 133 is the core 118 of a second differential transformer 119, which is also shown for sake of clarity with its windings 123, 124 and 125 detached. The windings of differential transformer 119 are physically mounted fixed to the trainer cockpit, and movement of core 118 in transformer 119 is thereby a measure of control stick position. Primary winding 123 of transformer 119 is excited by alternating voltage from power supply 143; and operating similarly to transformer 116, an output voltage commensurate with control stick position is developed across potentiometer R–101. Thus it will be seen that differential transformer 119 comprises a position-to-electrical signal transducer.

The alternating potential across potentiometer R–100 is amplified by a conventional alternating current amplifier shown in block form at 127, demodulated by a conventional demodulator shown in block form at 129 to provide a direct voltage which is amplified by a conventional direct-coupled amplifier shown in block form at 131. Demodulator 129 may take any one of a variety of forms. The direct voltage output potential from amplifier 131, which voltage is commensurate with the instantaneous force existing on control stick 100 is applied via summing resistor R–110 to a lag network comprising resistors R–108, R–111 and capacitor C–106, and also to the coil of relay K–100 and thence via resistor R–117 to ground. The output potential commensurate with stick position from potentiometer R–101 is amplified by an alternating voltage amplifier shown in block form at 126, demodulated by a demodulator shown in block form at 128 to provide a direct voltage, which is amplified by an amplifier shown in block form at 130 to provide a potential commensurate with control stick position. A potentiometer R–103 has its winding excited by constant potentials from the trainer power supply, and its wiper arm may be positioned by operation of a simulated trim control. For example, if elevator trim wheels are provided, such wheels may be connected to position potentiometer R–103. If the aircraft being simulated is provided with a trim button such as that shown at 101a on stick 100, a switch operated by button 101a may control a motor (not shown) to position the arm of R–103. Under given flight conditions a given control stick displacement results in a given control surface displacement. Trim tabs or surfaces associated with control surfaces serve to add to or subtract from the amount of control surface displacement that would be provided for by given stick movement, so that a given surface may be deemed to have an effective displacement according to the combined effect of its actual displacement and displacement of its associated trim surface. In fact, trim controls often operate through a mechanical summing device merely so as to add or subtract to or from main control displacement rather than to position an auxiliary surface. Thus the stick position potential applied via summing resistor R–102 and the trim position potential applied via resistor R–104 are added in summing amplifier U–101 to provide a potential commensurate with effective control surface position. This potential is applied to portions of a flight simulator computer shown in block form in FIG. 1 to derive an output potential commensurate with force required on the simulated control. Exemplary circuits for computing required forces will be explained below.

The existing control stick force potential and the required control stick force potential are compared at the input circuit of operational amplifier U–102, and any error or difference between these potentials is amplified by amplifier U–102. The output potential from amplifier U–102 is routed through resistor R–107, the coil of relay K–101 and "On-Off" switch S–100 to operate a hydraulic volve 137, the coils 141, 142 of which are shown in detached form for clarity. A source of hydraulic pressure shown in block form at 140 is connected through valve 137 to hydraulic cylinder 134. In an exemplary embodiment of the invention a hydraulic pressure source of approximately 1000 p.s.i. was connected through a valve to operate upon a piston approximately 1½ square inches in area. The mechanical linkages shown between proving ring 114 and stick 100 were chosen so that total deflection of the elevator control results in approximately one-half inch travel of piston 133 in cylinder 134. Servo-valve 137 is connected to pressure source 140 by a supply conduit 138 and a return conduit 139, and hydraulic cylinder 134 is connected to servo-valve 137 by conduits 135 and 136, each of which is connected to cylinder 134 on an opposite side of piston 133. A given polarity of current through windings 141 and 142 of valve 137 causes pressure to be admitted to one side of the piston and relieved from the other side. With no input current to the windings of valve 137 approximately one-third of the system supply pressure is applied to each side of the piston. Since the valve is polarized, the use of input signals of opposite polarity to windings 141 and 142 permit bidirectional application of forces to piston 133. A small alternating voltage from a 400 c.p.s. supply (not shown) is connected across potentiometer R–106 and applied to the input of the servo-valve through capacitor C–105. This potential, termed a "dither" voltage, causes rapid low amplitude hunting by the servo-valve to reduce the servo "dead-band" caused by the small but inherent static friction, inertia, hysteresis and backlash present in the hydraulic servo.

Direct current amplifier U–102 is provided with two feedback circuits. Capacitor C–107 and resistor R–112 are connected in series beteen the output and input circuits of amplifier U–102 and act as a conventional servo lead network. The output voltage from amplifier U–102 is applied as shown across the winding of potentiometer R–115 and resistor R–116. A manually-adjustable proportion of this voltage is applied to the amplifier input circuit via feedback resistor R–113 and via the series connection of capacitor C–108 and resistor R–114. As will be readily apparent to those skilled in the art, the adjustment of the amplifier feedback impedance by adjustment of potentiometer R–115 allows the overall gain of amplifier U–102 to be selected, thereby adjusting the loop gain of the entire hydraulic servo system. Capacitor C–108 and resistor R–114 comprise a further lead network. The purpose of the lead networks shown is to decrease the servo high frequency response, or rather, to increase the servo low frequency response. In constructing any specific embodiment of the invention lead networks may be used, if necessary, in accordance with well-known servo techniques to improve system frequency response.

Relays K–100 and K–101 are provided in the interests of safety to prevent sudden driving of the control stick to a limit of travel in case of certain system failures. Inasmuch as considerable force is available from hydraulic pressure supply 140, stick 100 otherwise could be driven toward a limit of travel at a terrific speed in the event of system failure. As mentioned above, the coil of relay K–100 is connected to the "force existing" output potential from amplifier 131. Thus whenever the output potential from amplifier 131 exceeds a predetermined maximum allowable level, the current through the coil of relay K–100 will be sufficient to transfer its contact, thereby grounding the direct voltage output being applied from amplifier U–102 to servo-valve windings 141 and 142, thusly tending to center the servo-valve and prevent increased forces. Similarly, the coil of relay K–101 is connected in series with the output of amplifier U–102, and upon occurrence of servo-valve winding current in excess of a predetrmined amount, the contact of relay K–101 will short the output of amplifier U–102 to ground, tending to center the servo-valve. Due to the magnitude of the hydraulic servo loop gain and due to the large available forces, relays K–100 and K–101 should be quick acting. The inductance of the coils of relays K–100 and K–101 has an effect on servo frequency response, and the lead networks shown are provided to correct for such inductance, as well as for various other servo component limitations.

Whereas FIG. 1 illustrates use of a *pressure*-controlling servo-valve 137, in actual practice of the invention a *flow*-controlling servo-valve is often preferred. Rather than the pressure valve, a flow control valve may be used between hydraulic pressure supply 140 and hydraulic cylinder 134. There are several models which may be used.

The application of forces to the mechanical linkages between grip 101 and proving ring 114 cause deflection or spring deformation of such linkages, such deflection usually being substantially directly proportional to control stick force. It will be seen that such deflection will result in a position signal from transformer 119 which is in error by the amount of such linkage deflection or "stretch." Since such stretch is substantially directly proportional to the existing stick force, one may compensate for such stick position signal error by adding to the stick position signal a potential proportional to existing force. This may be done, for example, by connecting part of the output potential of amplifier 131 through a resistor R–150 to the input circuit of amplifier U–101.

Since "stretch" in the linkages acts to decrease displacement of core 118 of transformer 119, the existing force potential added to the existing position potential must be of the same polarity as the existing position potential, so as to provide a compensated larger existing position potential. Since the control linkages used in an actual aircraft usually have a certain amount of stretch, the stretch which one may compensate for by the above-described means will often be the difference between the actual system linkage stretch.

The computer apparatus utilized to receive simulated control position and compute simulated control force required may vary widely with the simulation of different aircraft since numeorous different aircraft control systems are presently in use. Probably the most common elevator control system is described by the following expression:

$$\delta_e = f(\delta_{es})$$

wherein $\delta_e$ is actual elevator effective surface deflection, and $f(\delta_{es})$ is a function of elevator control or stick displacement. Elevator surface deflection often is directly proportional to stick displacement, so that the function is linear. Often a so-called "geared tab" system is provided, in which deflection of the elevator surfaces in one direction also causes deflection of elevator tabs (usually in the opposite direction) so as to lessen the hinge moment, or force required to deflect the elevator main surfaces. The $f(\delta_{es})$ may in many cases be a nonlinear function. A further common elevator control arrangement is the "spring tab" system, in which either the main surfaces or the tabs are directly linked to the control and the others are linked through a spring. In such a system, surface deflection becomes a function of dynamic pressure as well as stick deflection.

The size of the elevator surfaces and the high speed of some aircraft require such large forces to position the surfaces during high speed flight that power boost systems are very often used in aircraft. Often simple position servos of either the hydraulic or electrical type are used. If such servos operate linearly, elevator deflection will be a linear function of elevator control or stick displacement as expressed in the above equation. Often such servos have appreciable position and velocity errors, so that elevator surface position may be a time function of stick displacement. In such a case, the function expressing the relationship between $\delta_e$ and $\delta_{es}$ would contain the "gain" or overall transfer function of the servo used on the actual aircraft to position the surfaces.

In order that the pilot of an actual aircraft be made incapable of causing rapid extreme elevator deflections at such high speeds that the aircraft might be damaged, the power boost system capability is often reduced intentionally as airspeed, dynamic pressure, Mach number or some other function of speed increases. In some manually-operated control systems the manual forces required to displace the surfaces become too great at high speeds to allow the pilot of average strength to apply critical stresses to the airplane. In power systems the torque limit of the hydraulic or electrical servo is often chosen so as to make extreme surface deflections impossible at high speeds. These limitations of the power system are reflected in the values of the function in the above equation. In other words, $f(\delta_{es})$ may be a function of dynamic pressure, airspeed or Mach number, particularly at high values of these "speed variables." Thus it may be seen that for accurate simulation the computer shown in block form in FIG. 1 should receive the control position potential from amplifier U–101 and operate upon such input data in accordance with various conditions of simulated flight and produce further potentials commensurate with simulated surface deflection.

The force required on a particular aircraft control to maintain a given control surface deflection also may depend upon a number of characteristics of the aircraft being simulated. In a very common and simple manual control system, the elevator stick force $F_{se}$ may be a function of elevator main surface deflection $\delta_e$ and elevator trim surface deflection $\delta_{ett}$, or, alternatively, a first function of main surface deflection and a second function of trim surface deflection, such as expressed by the following equations:

$$F_{se} = f_{20}(\delta_e + \delta_{ett})q$$

or, alternatively, $$F_{se} = f_{21}(\delta_e) + f_{22}(\delta_{ett})q$$

where $q$ equals dynamic pressure.

In a full power boost control system without any special artificial feel provisions, the only stick force required to provide a given surface deflection would be that often negligible and constant force required to position a valve of a hydraulic servo or a potentiometer of an electrical servo. Since such stick forces give the pilot no indication of aircraft accelerations, almost all power boost systems contain further apparatus to enable the pilot to differentiate by stick "feel" between large and small control surface deflections. Therefore, the functions of the two above equations should contain the transfer functions of any artificial feel system incorporated into the aircraft being simulated.

The pair of stick force expressions above neglect the effect of friction $F_{fre}$ of the actual aircraft linkage system and inertia $F_{ie}$ of the actual aircraft stick and linkage system. For many aircraft these effects may be considered constant, and constant potentials may be derived for simulation, and sometimes those effects may be neglected. Some aircraft are provided with springs to require the application of increased forces upon displacement of various controls from a neutral position. While such springs are infrequently applied to elevator control sticks, it may be seen that the force required to displace the control from any selected position would be a linear function of the control displacement from the selected position, assuming that linear springs were used to apply forces to the control.

Figure 2:
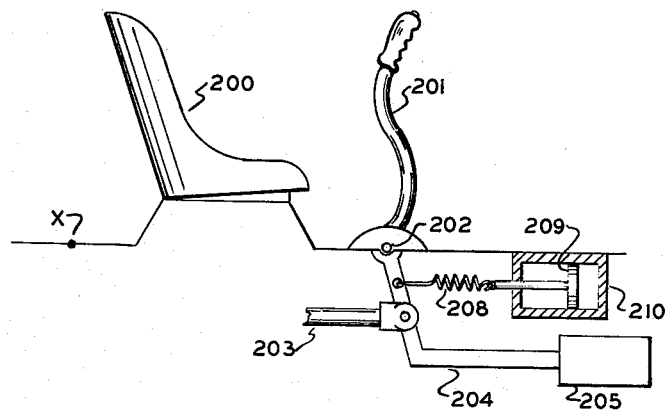
FIG. 2 is a diagram showing schematically a cross-section view taken through an actual aircraft, with certain apparatus shown schematically to illustrate the operation of such an aircraft system.

Referring to FIG. 2 there is shown schematically a portion of a sectional view through a typical aircraft. Mounted in front of pilot's seat 200 is a conventional control stick 201 which pivots about an axis 202 upon fore and aft movement of stick 201. A linkage 203 partially shown leads either to further linkages to actuate the aircraft elevators or to a position-to-electrical or hydraulic signal transducer to operate a servo system to position the elevators. Further mechanical connections made to stick 201 to transmit lateral motion of the stick to aileron-operating apparatus are not shown in FIG. 2 but are, of course, supplied in an actual aircraft. Also shown in FIG. 2 as being rigidly attached to a bellcrank lever 204 is a heavy mass 205 commonly called a bobweight. It will be seen that the weight of bobweight 205 provides a force tending to move stick 201 forwardly. If the aircraft is in steady-state level flight, it will be seen that bobweight force is constant. If, however, the aircraft acquires a vertical acceleration, it will be seen that the inertia of bobweight 205 may apply an increased or decreased force to tend to urge stick 201 either forwardly or rearwardly. Assume that the pilot pushes stick 201 forward, nosing the aircraft downwardly as so to cause a downward acceleration of the aircraft of several G's. The inertia of bobweight 205 will be seen to urge stick 201 rearwardly with a torque proportional to the mass of the bobweight, the lever arm distance of bobweight 205 from axis 202 and the amount of downward acceleration. Conversely, an upward aircraft acceleration causes bobweight 205 to urge stick 201 forwardly. Except for the unlikely condition during which the aircraft center of gravity X is located within bobweight 205, it will be seen that a pitching acceleration $\dot{q}_1$ about X will cause a bobweight torque about axis 202. Since the action of the bobweight is to oppose the stick movement made by the pilot, it will be seen that a bobweight acts somewhat as a regulator to help prevent extreme control stick movements, and since the bobweight force is proportional to aircraft acceleration a realistic indication of aircraft acceleration is given to the pilot. It should be mentioned that bobweights often are connected to a portion of the linkage between the stick and the surfaces controls rather than to the surfaces themselves; and, as will be further explained below, bobweight force sometimes becomes a function of stick position as well as aircraft acceleration.

A further means sometimes used in actual aircraft to provide desired stick forces is a series-connected spring and dashpot combination called a "sprashpot." As shown in FIG. 2 in schematic form, a spring 208 which operates both in tension and compression is connected between control stick 201 and the piston 209 of dashpot 210, the cylinder of dashpot 210 being rigidly connected to the aircraft frame. The dashpot applies viscous damping, so that the force existing across the dashpot at any instant is commensurate with the velocity of movement of dashpot piston 209. The differential equation expressing the effect of the "sprashpot" is as follows:

$$F_{spr} = k_1 \dot{\delta}_{es} - k_2 \dot{F}_e$$

wherein $F_{spr}$=force applied to the stick by the sprashpot.
$\dot{\delta}_{es}$=rate of movement of the stick.
$\dot{F}_e$=rate of change of force applied to the stick.

Since the "sprashpot" provides stick forces commensurate with the rate of stick movement and rate of change of force applied to the stick, it will be seen that it "anticipates" undesirable aircraft accelerations caused by rapid or jerky control stick movements by the pilot, and it applies forces to resist such movements immediately, rather than requiring the presence of an aircraft acceleration to provide a resisting force, as in the case of a bobweight. In simulating control stick forces due to a "sprashpot," the computer solves the above differential equation and applies a force required command signal to the hydraulic servo portion of the invention to require the correct force on the simulator control, as will be explained in detail hereinafter.

Figure 3:
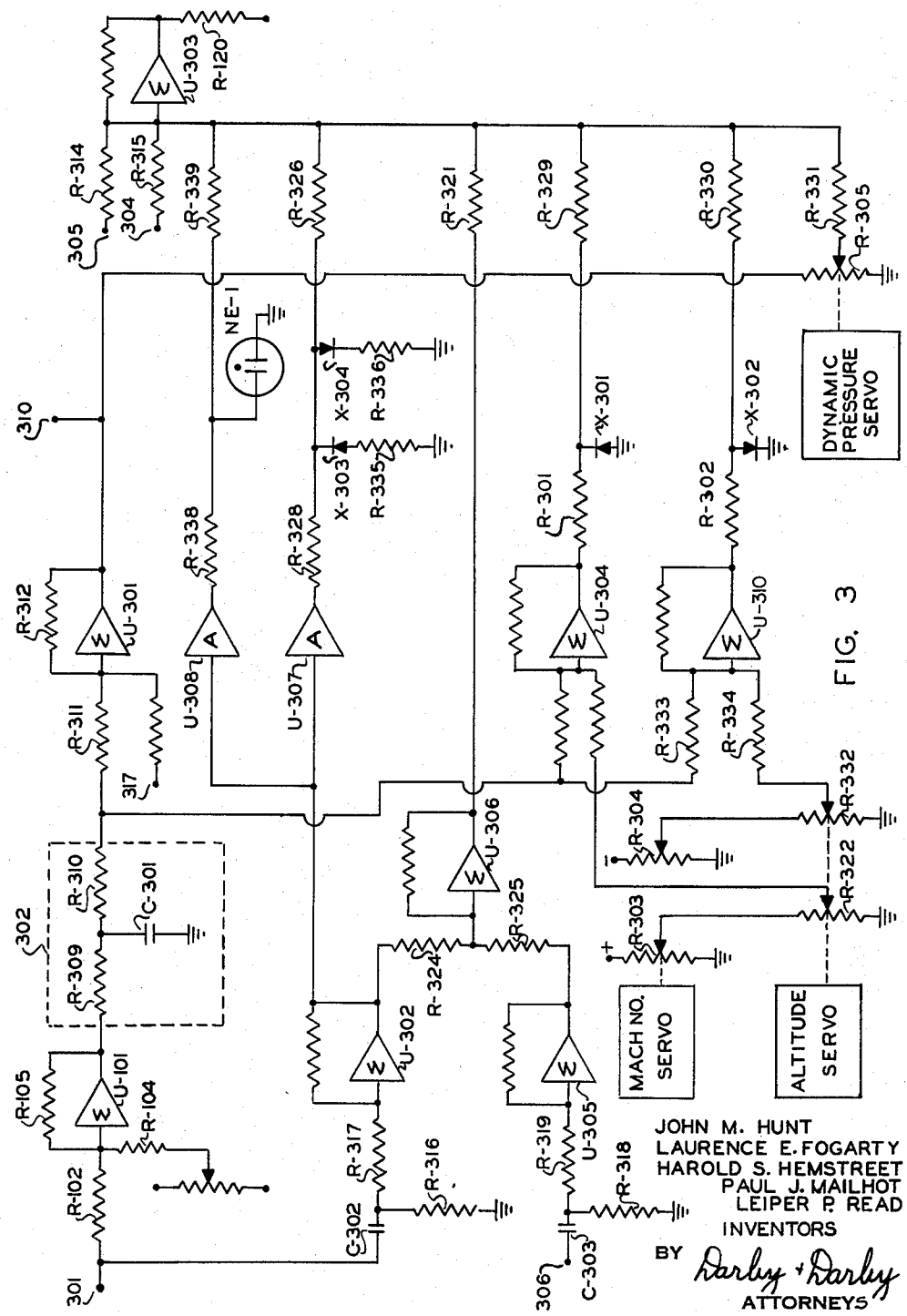
FIG. 3 is an electrical schematic diagram of an exemplary computer portion of the invention for use with apparatus such as shown in FIG. 1 for simulating aircraft elevator control operation.

Reference may be had to FIG. 3 wherein is shown in schematic form an exemplary embodiment of an "elevator control force required" computer constructed in accordance with the invention. A direct voltage commensurate in magnitude with simulated stick position and derived as explained above with relation to FIG. 1 is applied via summing resistor R–102 to the input circuit of summing amplifier U–101. This potential is combined with the elevator trim tab position potential applied through resistor R–104 to provide an output potential commensurate with the combined elevator movement of the stick and the movement of the elevator trim wheel. A first function of the apparatus shown in FIG. 3 is to receive the output potential from amplifier U–101 commensurate with control movement and to compute simulated surface deflection. The precise system of FIG. 3 applies to the simulation of an aircraft having a servo-positioned elevator surfaces. The output potential from amplifier U–101 is applied via a network, shown within dashed lines at 302 as a lag network comprising resistors R–309, R–310 and capacitor C–301. Network 302 is selected so as to have a transfer function similar to that of the actual aircraft elevator servo.

A simple lag network such as that shown will provide an output potential proportional to stick position but delayed in time, simulating the delay in the actual aircraft system between control stick movement and aircraft surface position. In simulating operation of a system employing rigid mechanical connection between the control and the surface, network 302 may be eliminated.

As mentioned above, main control surfaces or auxiliary control surfaces often are linked to an aircraft control through a spring, so that high dynamic pressure conditions sometimes prevent excessive surface deflections. Also, if surface positioning servos with limited torque are used, excessive surface deflections are sometimes avoided. In the common "manual-power" surface positioning system, movement of the control so as to exceed the power capabilities of the boost system results in an increased control force gradient, so that considerably increased manual forces on the stick are necessary to position the surface beyond the maximum deflection to which the boost system is capable of positioning the surface.

The simulated control surface position potential at the output of network 302 is applied to a pair of comparators shown as comprising summing amplifiers U–304 and U–310. Potentiometers R–303 and R–322, and potentiometers R–304 and R–332, positioned as shown by conventional trainer dynamic pressure and Mach number servos, each derive two potentials which are applied to amplifiers U–304 and U–310, respectively. These potentials each represent limit forces, one of said potentials representing the maximum aerodynamic hinge moment on the surfaces during one direction of surface deflection, and the other of said potentials representing the maximum aerodynamic hinge moment on the surface during the opposite direction of surface deflection. Otherwise explained, the potentials applied to amplifiers U–304 and U–310 each represent for a different direction of simulated surface deflection, the maximum position to which the simulated aircraft boost system is operative to position the control surfaces. If the pilot attempts to provide greater surface deflection than the above-described maximum he must provide the additional force manually, resulting in a substantially increased stick force gradient, i.e. force per unit deflection of the surfaces.

The simulated surface deflection potential from the output of network 302 is compared with the simulated maximum deflection potentials in amplifiers U–304 and U–310, each of the summing amplifiers providing output potentials commensurate with the sum or difference of its applied potentials. The output circuits of the comparator amplifiers contain oppositely-poled rectifiers. Assume that backward stick displacement causes an increasingly positive potential output from network 302. This potential is applied via a resistor R–333 to amplifier U–310 and compared with a simulated maximum force potential applied to amplifier U–310 via summing resistor R–334. Under normal simulated flight conditions, the positive potential from network 302 will exceed the negative limit potential from potentiometer R–332, making the output potential from amplifier U–310 negative. Rectifier X–302 effectively shorts negative potentials to ground, thereby providing no input potential to amplifier U–303 from amplifier U–310. When simulated Mach number and altitude increase so as to provide a sufficiently large negative potential to override the simulated surface deflection potential from network 302, the resulting positive potential from amplifier U–310 is applied to amplifier U–303 via summing resistor R–330. This potential is of such a polarity as to increase the "force required" potential output from amplifier U–303. Since considerable gain may be provided by amplifier U–310, the simulated "force required" potential output from amplifier U–303 may be made to increase as sharply as desired when the control is positioned so as to call for surface deflection exceeding the capabilities of the surface positioning system.

Amplifier U–301 acts as a buffer or isolation amplifier, and provides a potential commensurate with simulated surface deflection at its output circuit. This potential is routed to terminal 310, from where it may be connected to other portions (not shown) of the simulator for use in computing quantities which are functions of simulated control surface position. Considering an elevator control system, the most important quantity of this type is the simulated pitching moment due to elevator deflection.

The force which exists upon any aircraft control surface depends upon the angle between the plane of the surface and the relative airstream. This angle, in turn, depends upon both surface deflection from a neutral position relative to the aircraft axis and the angle between the aircraft axis and the flight path or "relative wind axis" of the aircraft. Thus a potential commensurate with simulated coefficient of lift, or alternatively, simulated angle of attack may be applied at terminal 317 to be added to the surface deflection potential applied via resistor R–311, thereby making the output potential from amplifier U–301 a measure of the relative airstream angle, if more accurate simulation is desired.

The potential applied at terminal 317 also may contain components which simulate the forces on the elevator due to the dynamics of the airplane. For an elevator system, for example, it is within the scope of the invention to apply potentials commensurate with $\alpha/V_p$ and $q_1/V_p$, wherein $\alpha$ is the simulated rate of change of angle of attach, $q_1$ is simulated pitching rate, and $V_p$ is simulated airspeed. These quantities all commonly exist as voltages or shaft positions in contemporary simulators, as shown in application Ser. No. 477,741, for example. FIG. 5 shows exemplary means for computing such potentials.

The simulated surface position potential output from network 302 is applied via amplifier U–301 and thence to excite potentiometer R–305, the arm of which is positioned by the trainer dynamic pressure servo, thereby deriving a first simulated stick force potential, which is applied via summing resistor R–331 to summing amplifier U–303.

This potential is approximately proportional to the actual force necessary to position the surface. Numerous artificial feel systems apply stick forces which are proportional to, but only fractions of the force required from a servomotor to position the control, and the scaling of resistor R–331 may effect the required proportionality.

Applied to terminal 304 is an aerodynamic vertical acceleration potential which may be derived in conventional flight simulator fashion by apparatus not shown. This acceleration potential, commensurate with all accelerations of the aircraft along the vertical axis (except the acceleration due to gravity) may be derived, for example, in the manner shown in application Serial Number 477,741, now Patent No. 2,925,667, filed December 27, 1954, by Laurence E. Fogarty, for "Aircraft Trainer Apparatus" and assigned to the same assignee as the present invention. The potential applied via resistor R–315 represents the stick force required due to operation of a bobweight during vertical acceleration of the simulated aircraft. Since the acceleration of gravity acts both on the aircraft and the bobweight, it will be seen that it produces no stick force, and hence the potential applied to terminal 304 omits gravitational acceleration. A potential commensurate with simulated pitching acceleration derived in conventional manner, such as shown in the above mentioned Fogarty application, for example, may be applied via terminal 305 and via resistor R–314 to simulate the effect of the bobweight on stick force due to pitching of the simulated aircraft about its lateral axis. Since this component of bobweight force depends upon the distance between the aircraft center-of-gravity and the bobweight, the potential applied to terminal 305 may be modified in accordance with the position of the center-of-gravity of the simulated aircraft by means of a potentiometer (not shown) operated by a conventional grounded trainer center-of-gravity servo (not shown), or a potentiometer (not shown) manually operated by the instructor.

Reverting to FIG. 2, it will be seen that the effective lever arm distance between bobweight 205 and axis 202 will vary with stick position, so that the bobweight forces are actually functions of stick position as well as vertical acceleration and pitching acceleration. If desired, potentiometers (not shown) actuated by stick 201 may be used to modify bobweight potentials applied to amplifier U–303. Since many aircraft utilizing bobweights connect the bobweight to the stick at an appreciable distance from the stick pivot point, the variation in bobweight force due to rotation of the bobweight about the stick pivot axis often is small enough to be neglected.

Summing amplifier U–302 receives two input potentials commensurate with the effect of a "sprashpot" as discussed above. The potential at terminal 301 commensurate with stick position is applied to a differentiating network comprising capacitor C–302 and resistor R–316. The potential commensurate with rate of change of stick position appearing across resistor R–316 is applied via summing resistance R–317 to amplifier U–302. The potential at terminal 306 commensurate with instantaneous stick force is applied to a differentiating network comprising capacitor C–303 and resistance R–318 to provide a potential commensurate with rate of change of stick force for application to summing amplifier U–305 via resistor R–319. The output potentials from amplifiers U–302 and U–305 are combined in amplifier U–306 to provide a potential commensurate with stick force due to a "sprashpot," which potential is applied to summing amplifier U–303 via summing resistor R–321.

The input potential from amplifier U–302 commensurate with rate of change of stick movement $\delta_{es}$, or stick velocity, is also amplified by a high gain amplifier U–307 and applied via resistor R–328 across diodes X–303 and X–304, each of which is connected through a series resistor to ground to act as a clipper or limiter. Sufficient gain is provided in amplifier U–307 to cause clipping by one or the other of the diodes at all stick velocities above an extremely low stick velocity, thereby providing a substantially constant potential commensurate with dynamic friction of the linkage system. This potential is applied via scaling resistor R–326 to amplifier U–303 with a scale factor so as to provide a friction force input potential to amplifier U–303 that is commensurate with the difference in friction between the simulator linkage system and the actual aircraft linkage system. Friction may be introduced intentionally into the simulator linkages, if desired, such as by tightening pivots, or by slides (not shown) placed in frictional engagement with the linkage, for example, to insure that simulator linkage friction exceeds actual aircraft linkage friction. Then, the friction force potential computed as shown above and applied to amplifier U–303 may be of such a polarity as to comprise "negative friction," i.e., to act against the inherent mechanical friction of the simulator linkage system.

To simulate the effects of static friction, a potential is derived for application to summing amplifier U–303 only during very limited stick velocities. The rate of change of stick position potential at the output circuit of amplifier U–302 is amplified considerably by amplifier U–308, and applied via resistor R–338 across a switching means shown as comprising simply a neon bulb. During extremely small stick velocities, the stick velocity potential is amplified considerably by amplifier U–308, providing a potential having a polarity commensurate with direction of stick movement, so as to apply a static friction potential to amplifier U–303. Upon increase of stick velocity above the extremely small stick velocity at which static friction operates, the potential output from amplifier U–308 becomes sufficient to exceed the ionization potential of neon lamp NE–1, causing the lamp to conduct heavily. The current drawn through lamp NE–1 upon ionization causes a voltage drop across resistor R–338, thereby decreasing to a low value the static friction potential applied to amplifier U–303 via resistor R-339. If desired, a fast-acting relay may be substituted for the neon lamp switching means shown.

Control system friction often is of minor importance except for low speed flight or extremely small control movement, since it is obscured by the magnitude of other control forces during other flight conditions or maneuvers. In some embodiments of the invention, it may be considered desirable from an economical standpoint to neglect the computation and application of the friction force potentials to the servo system of the invention. Often, those skilled in the art will choose to design the simulator linkage system to provide the same friction as that of the actual aircraft system, thereby obviating the need for a computed friction force potential.

As well as static and dynamic friction, each control of an actual aircraft has certain inertia which must be overcome to move the control. The control force caused by inertia of parts linked to a control is proportional to the rate of change of velocity, or acceleration, of the control. It is within the scope of the invention to mount a conventional accelerometer to be actuated by acceleration of the control and its associated linkages, to rectify or demodulate the accelerometer output potential, amplify it and apply it through a scaling resistor to amplifier U-303 in the same manner other forces are computed. For most simulator applications, however, it is much simpler and more economical merely to attach weights to the simulator linkage system so as to duplicate the inertia of the actual aircraft stick and linkage system.

Amplifier U-303 receives each of the force potentials described above and provides an output potential commensurate with their sum, the force required to be applied to the stick by the hydraulic servo portion of the invention. As mentioned above, this potential is applied via resistor R-120 to the input circuit of amplifier U-102 (FIG. 1).

In the simulation of a direct manual control system in which the stick is connected directly through mechanical linkages or cables to the elevator surfaces and in which no power boost system is provided, the transfer network 302 of FIG. 3 would be omitted, as mentioned above. The major component of stick force during most flight conditions will be simulated by the function of dynamic pressure potential derived by potentiometer R-305 and applied to amplifier U-303 via summing resistor R-331, and this potential will represent the force applied to the stick by the aerodynamic hinge moments caused by air acting against the elevator surfaces. Since these moments are also a function of Mach number, the potential from potentiometer R-305 also may be modified by a shaped potentiometer (not shown) having its arm positioned by a conventional trainer Mach number servo.

In the simulation of a "full power" control system, in which the control stick is linked to a servo control valve or potentiometer, and the entire force applied to position the aircraft control surfaces is applied by a servo, a transfer network such as that shown at 302 may be used to simulate the dynamic operation of the aircraft servo, including its load, the aircraft surfaces and the mechanical connections, such as actuators, between the aircraft control surface positioning servo and the surfaces. With a "full power" control system in operation, no hinge moment force from the surfaces is mechanically linked back to the stick except through the artificial feel system employed in the aircraft to provide the pilot with an indication of the magnitude of the stresses being applied to the aircraft. If the specific artificial feel system provides a stick force commensurate with dynamic pressure, as is often the case, a circuit such as that shown in FIG. 3 may be used, with the potential applied through summing resistor R-331 being scaled so as to produce a stick force commensurate with the force applied to the actual aircraft stick by the artificial feel system. Sometimes the aircraft artificial feel system has a measurable time lag or other dynamic characteristic, and, if desired, such characteristic may be simulated by provision of a suitable transfer network in the means utilized to derive the artificial feel system force potential. For example, if the artificial feel system has a simple time lag, a lag network similar to that shown at 302 may be inserted between potentiometer R-305 and summing resistor R-331.

To simulate a "manual-power" control system in which control surfaces are positioned both by forces mechanically transmitted from the stick and by forces from a servo or other motive means, the potential derived from potentiometer R-305 should be modified in accordance with the relation between actual force required to position the aircraft surface and the proportion of that force supplied manually by the control. Since many "manual-power" boost systems merely scale down the force needed at the control, the scaling of summing resistor R-331 often is sufficient to provide a proper input to amplifier U-303.

In view of the detailed explanation illustrating application of the invention to an elevator system, those skilled in the art will be enabled to apply readily the principles of the invention to the simulation of rudder at other surface aileron operation. Most aileron control systems and most rudder control systems are somewhat more simple than the elevator system shown in FIG. 3, since "sprashpots," bobweights, etc. are seldom used on aileron or rudder controls. A number of contemporary aircraft are provided with a "yaw damper" or an autopilot, however, and it usually is desirable to simulate the effects of such apparatus upon control forces.

The rudder surface deflection of a typical simple direct-mechanical rudder control system might be expressed as follows:

$$\delta_r = \delta_{rp} + \delta_{ttr} - kF_r$$

wherein $\delta_r$=rudder surface deflection
$\delta_{rp}$=rudder pedal displacement
$\delta_{ttr}$=rudder trim adjustment
$kF_r$=rudder pedal force times a constant, which is commensurate with "stretch" in the rudder control system. Utilizing the relationship expressed by the above equation, one may derive a potential commensurate with simulated rudder surface deflection. The rudder pedal force which accompanies the computed rudder surface deflection may be computed from an expression such as the following:

$$F_r = f(\delta_r - \delta_{ttr})q + F_{fr}$$

wherein $F_r$=rudder pedal force, $f(\delta_r - \delta_{ttr})$ is a function of rudder main surface deflection minus rudder trim surface deflection, which function may or may not be linear, $q$ is dynamic pressure, and $F_{fr}$ equals rudder system friction.

In a direct manual rudder control system the function of rudder and trim surface deflections would comprise a function of dynamic pressure, since the hinge moment of the rudder would be a function of dynamic pressure. It will be understood that sideslipping will affect the pressures exerted on the rudder of an aircraft, so that modification of rudder pedal pressure in accordance with simulated sideslip angle may be provided. In a full-power rudder control system, it will be seen that rudder pedal force is a function only of friction and pedal inertia unless artificial feel means are provided. Inasmuch as rudder operation is inherently less likely than stick operation to overstress the aircraft, the provision of artificial feel is less critical, and some full power rudder control systems merely provide simple spring means to resist the forces applied to the rudder pedals by the pilot's feet. In such a case the above expression becomes a constant and may constitute the spring constant.

In some aircraft equipped with a "yaw damper," the "yaw damper" output is applied to the rudder surface-positioning servo in parallel with the input from the rudder pedals, so that "yaw damper" operation does not affect pedal forces directly. In some other aircraft equipped with a "yaw damper," the "yaw damper" output controls a torque motor which urges the rudder pedals and the rudder surface in a direction so as to diminish rate of turn or side acceleration. Suitable provision may be made in simulators constructed in accordance with the invention to simulate the rudder pedal forces of the latter type of "yaw damper," as will be explained below in greater detail. The above equations expressing rudder surface deflection and rudder pedal force may be modified to the following forms to include the operation of a "yaw damper":

$$\delta_r = (\delta_{rp} + \delta_{ttr} + \delta_{YD})_q + fF_r$$

and $$F_r = f(\delta_r - \delta_{tttr} - \delta_{YD})_q + F_{fr} + F_{Ir}$$

wherein $\delta_{YD}$ equals "yaw damper" output potential. Shown in FIG. 4 are portions of an exemplary simulated rudder system constructed in accordance with the invention. A pair of simulated rudder pedals 410 operable by a student pilot serve to rotate shaft 411, which is rotatably journalled in bearing 412. Arm 413 extends perpendicularly from shaft 411, and the outer end of arm 413 is mechanically connected through a proving ring 414 to hydraulic cam 415. A differential transformer or other electrical signal transducer such as a strain gage (not shown) operated by proving ring 414 provides an output potential which is amplified, demodulated and amplified by amplifier 416, demodulator 417 and amplifier 418, respectively. The output potential from amplifier 418 is commensurate with instantaneous rudder pedal force, and this potential is applied via conductor 402 for purposes to be described below. Shaft 411 also is connected mechanically to operate position-to-electrical signal transducer 420, and thereby amplifier 421, demodulator 422 and amplifier 423 providing an output potential on conductor 401 commensurate with rudder pedal displacement. It should be noted that arm 413 does not transmit the forces linearly between proving ring 414 and shaft 411, but rather sinusoidally. If large rudder pedal deflections cause rotation of shaft 411 through considerable angles, the non-linearity will cause erroneous rudder pedal forces. The proper linearity may be obtained by reduction gearing, for example, between shaft 411 and arm 413 so that arm 413 rotates only through small angles during maximum pedal deflection, or by any of many means well known to those skilled in the art.

The simulated rudder pedal position potential on conductor 401 is applied via summing resistor R-401 to amplifier U-401. A potential commensurate with simulated rudder trim position is derived by potentiometer R-403 and applied to amplifier U-401. A potential commensurate with instantaneous rudder pedal force is applied from conductor 402 to amplifier U-401 via resistor R-404. This latter potential is commensurate with "stretch" in the rudder linkage system. Also applied to summing amplifier U-401 via resistor R-406 is a yaw damper potential derived as will be explained below. The output potential from amplifier U-401 is commensurate with simulated rudder surface position. This potential is applied to amplifier U-402 via summing resistor R-407. A potential commensurate with simulated sideslip angle derived in conventional grounded trainer fashion is applied at terminal 403 and via resistor R-408 to amplifier U-402. Thus it may be seen that the output potential from amplifier U-402 is a function both of simulated surface position and simulated sideslip angle. It may be understood that the hinge moment on the rudder surface of an aircraft will be determined by both of these variables, as well as by dynamic pressure and Mach number, since the force on the aircraft rudder surface depends upon the angle between the surface and the relative airstream. The potential from amplifier U-402 hence is a function of the angle between the simulated control surface and the relative airstream and thusly commensurate with the area of the rudder surface presented to the airstream. Further potentials described below wtih relation to FIG. 5 may be added into amplifier U-402 to provide a more accurate relative airstream quantity, if desired. This potential is modified by potentiometers R-411 and R-412 in accordance with simulated Mach number and simulated altitude to provide a potential at terminal 407 commensurate with simulated "force required" on the simulated rudder pedals due to servodynamic force on the rudder surface. As mentioned above, the force applied to a control surface is a function of dynamic pressure and Mach number. Since dynamic pressure is a function of Mach number and altitude, it is often convenient in simulators using Mach number servos to utilize functions of Mach number and altitude rather than making a separate computation of dynamic pressure. The aerodynamic force potential on the arm of potentiometer R-412 is applied to summing amplifier U-405 via resistor R-418. A potential commensurate with rudder pedal displacement is applied to amplifier U-405 via summing resistor R-419. This latter potential will be commensurate with the rudder pedal force necessary to overcome the force of any spring connected to the aircraft rudder pedals to tend to center the pedals, assuming that a linear spring is utilized. Alternatively, resistors R-419 may be omitted and an actual spring may be used on the rudder pedals of the trainer to duplicate the forces caused by any such spring means attached to the rudder pedals of the actual aircraft. Any further forces to be simulated may be added as further input potentials into amplifier U-405. This amplifier sums the applied potentials and provides an output potential at terminal 407 commensurate with "force required" on the simulated rudder pedals. The "force required" potential at terminal 408 is compared with the "force existing" potential on conductor 406 by servoamplifier 425, and the output of the servoamplifier utilized to operate servo-valves shown generally in block form at 426. The rudder control system of an actual aircraft also has static and dynamic friction, and inertia. Potentials derived similarly to the friction and inertia potentials used in the elevator system of FIG. 3 may be derived for use in the rudder system of FIG. 4, if desired.

Applied to terminal 404 to excite potentiometer R-413 may be a potential commensurate with either simulated rate of turn or simulated rate of change of side acceleration derived in conventional grounded trainer manner by means not shown. Which of these potentials or what other potential should be applied will depend upon the nature of the yaw damper or autopilot used in the aircraft being simulated. In the case of a yaw damper which is operated by a directional gyro, the potential applied to terminal 404 in simulation of such a yaw damper should be commensurate with simulated rate of turn. In the case of a yaw damper which is operated by an accelerator, a potential commensurate with the rate of change of side acceleration should be applied. Yaw dampers utilizing side acceleration measuring accelerometers commonly differentiate the output signal from the accelerometers. The above-mentioned Fogarty application illustrates a typical means for providing rate of turn and side acceleration potentials. The side acceleration potential may be differentiated, such as by means of a conventional series-capacitor, shunt-resistance differentiating circuit, to provide excitation for potentiometer R-413. The arm of potentiometer R-413 is positioned by the trainer Mach number servo to provide a simulated yaw damper actuating signal which is routed through a simulated yaw damper "On-Off" switch S-401 and resistor R-414 to buffer amplifier U-404. The output from amplifier U-404 is applied to a transfer network shown as comprising a simple lag network of resistors R-416, and R-417 and capacitor C-401. This network is chosen so as to have a transfer function similar to that of the yaw damper servo of the aircraft being simulated, so that the output potential from amplifier U-404 is modified to provide a potential at amplifier U-403 commensurate with simulated yaw damper mechanical output. As mentioned above, this potential is applied to amplifier U-401 via resistor R-406. While this portion of the invention has been shown as being applied to a yaw system, it will be apparent that it may as well be applied to the simulation of aircraft pitching systems by modifications which will be readily apparent to those skilled in the art as a result of this disclosure.

Shown in FIG. 5 in electrical schematic form is apparatus which may be utilized to provide quantities to compute the simulated relative airstream acting on simulated control surfaces with increased accuracy.

Potentials commensurate with simulated rate of turn $r$ and simulated rate of change of sideslip angle, or $\dot{\beta}$, are applied via resistors R-504 and R-505 to feedback amplifier U-501. The output potential from amplifier U-501 excites the winding of potentiometer R-501, the arm of which is positioned in accordance with simulated airspeed $V_p$ by means of the conventional trainer airspeed servo shown in block from. The potential on the arm of potentiometer R-501 is applied through scaling resistor R-506 to the input circuit of amplifier U-501, thereby providing a potential output from amplifier U-501 commensurate with the quantities $$\frac{r}{V_p}$$

and $$\frac{\dot{\beta}}{V_p}$$

This potential is applied via summing resistor R-507 to be added with a simulated sideslip angle potential $\beta$ applied via resistor R-508. The output potential from amplifier U-502 may be added to the simulated rudder surface deflection potential computed as shown in FIG. 4. In simulation of a propeller-driven airplane, a further potential may be added at amplifier U-502 to simulate the effect of "propwash" on the rudder hinge moment.

Potentials commensurate with simulated rate of change of angle of attack, or $\dot{\alpha}$, and simulated pitching rate, $q_1$, are applied via summing resistors R-510 and R-511 to amplifier U-503, the output circuit of which is connected to excite potentiometer R-502 to divide by simulated airspeed in the same manner as potentiometer R-501. The $$\frac{\dot{\alpha}}{V_p}+\frac{q_1}{V_p}$$

output potential from amplifier U-503 is applied through resistor R-513 to be added with either a simulated coefficient of lift ($C_L$) or a simulated angle of attack potential applied via summing resistor R-514. The output potential on terminal 317 from amplifier U-504 may be applied to the elevator simulating circuit shown in FIG. 3 as described above. Similarly, a simulated rate of roll ($p$) potential is divided by simulated airspeed by means of amplifier U-505 and potentiometer R-503, providing a potential at terminal 510 which may be added to a simulated aileron surface deflection potential to compute aileron hinge moments with greater accuracy. Further potentials commensurate with simulated propwash effect also may be added in amplifiers U-504 and U-505.

The "propwash" effects on the control surface hinge moments are functions of torque coefficient. The precise functions differ widely with different aircraft, the functions for some aircraft merely being constants. Torque coefficient may be specified as $$\frac{T}{\rho k N^2 D^5}$$

wherein T is engine torque, $\rho$ is air density, $k$ is a constant, N is propeller r.p.m. and D is propeller diameter. If desired, simulated propwash effect potentials may be computed in accordance with an expression such as that above and applied as explained to affect the simulated hinge moments.

While we have illustrated our invention by embodiments utilizing D.C. electrical analogue computation, those skilled in the art will recognize that alternating current computation may be substituted. Also, mechanical equivalents may be substituted for many of the electrical computing means shown without departing from the invention. The operational amplifiers, computing servomechanisms, potentiometers and like apparatus all may be of the types presently utilized in the flight trainer industry. While we have shown simple lag networks for providing transfer functions to simulate operation of various aircraft equipment, it is realized that many aircraft utilize equipment having more complex transfer functions, and it is intended that other transfer networks, both active and passive, may be substituted for those shown. Circuits for simulating the operation of a wide variety of apparatus are shown in "A Palimpsest on the Electronic Analog Art," published by Geo. A. Philbrick Researches, Inc., Boston, Massachusetts, 1955, as well as numerous other places in the literature.

A number of buffer amplifiers and "sign-changers," or polarity inversion amplifiers, have been omitted for sake of clarity. All potentiometers have been illustrated as being simple linear potentiometers for simplification, and those skilled in the art will readily recognize which should be made non-linear.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. Grounded training apparatus comprising in combination a simulated flight control member, a mechanical linkage connecting said member through a force-to-electrical signal transducer to a bi-directional hydraulic force-producing means, a position-to-electrical signal transducer connected through said linkage to said control member, said force-to-electrical signal transducer providing a first potential commensurate with force applied to said simulated control member and an additional potential equal to a fraction of the magnitude of said first potential whereby said additional potential may compensate for the stretch in said mechanical linkage, said position-to-electrical signal transducer providing a second potential commensurate with the position of said simulated control member, means for combining said additional and second potentials to provide a stretch compensated third potential commensurate with simulated position of a simulated aircraft control surface actuated by said simulated control member, means responsive to said third potential and to further simulated flight conditions to provide a fourth potential commensurate with force required on said member in accordance with said simulated conditions, means for comparing said fourth potential and said first potential to provide a force error potential, and means for amplifying said error potential to operate said hydraulic force-producing means.

2. Control loading apparatus for a grounded flight trainer comprising in combination a simulated control member, a linkage connecting said member to hydraulic servo force-producing means through a force-to-electrical signal transducer to provide a first potential commensurate with force applied to said member, computer means for deriving further potentials commensurate with force acting upon a control member of an actual aircraft, means for summing said further potentials and means for comparing the sum of said further potentials with said first potential to provide an error potential, and means connecting said error potential to said force-producing servo means, said computing means including a position-to-electrical signal transducer operated by said control member to derive a second electrical potential, means for combining said second potential with a portion of said first potential to provide a third potential commensurate with position of a simulated control surface compensated for stretch in said linkage, and means for modifying said third potential to provide one of said further potentials.

3. Control loading apparatus for a grounded flight trainer comprising in combination a simulated control member, a linkage connecting said member to hydraulic servo force-producing means through a force-to-electrical signal transducer to provide a first potential commensurate with force applied to said member, computer means for deriving further potentials commensurate with force acting upon a control member of an actual aircraft, means for summing said further potentials and means for comparing the sum of said further potentials with said first potential to provide an error potential, and means connecting said error potential to said force-producing servo means, said computer means comprises first differentiating means for deriving a first further potential commensurate with the rate of change of force applied to said control member and second differentiating means for deriving a second further potential commensurate with the rate of change of position of said control member, whereby a force is applied to said control member simulating the force applied to the control member of an actual aircraft by a sprashpot.

4. Apparatus according to claim 3 in which said first differentiating means comprises an electrical differentiating circuit responsive to said first potential and in which said second differentiating means comprises a position-to-electrical signal transducer operated by said control member to provide a simulated stick position potential and a second electrical differentiating circuit responsive to said stick position potential.

5. Control loading apparatus for a grounded flight trainer comprising in combination a simulated control member, a linkage connecting said member to hydraulic servo force-producing means through a force-to-electrical signal transducer to provide a first potential commensurate with force applied to said member, computer means for deriving further potentials commensurate with force acting upon a control member of an actual aircraft, means for summing said further potentials and comparing the sum of said further potentials with said first potential to provide an error potential, and means connecting said error potential to said force-producing servo means, said computer means comprising means for deriving a second potential commensurate with the simulated position of a simulated aircraft control surface, means responsive to said second potential for deriving a third potential commensurate with forces acting on said simulated control surface, and further means responsive to said third potential for deriving a further potential commensurate with forces mechanically transmitted from said simulated control surface to the control member of an actual aircraft, when said third potential reaches a limiting magnitude which is a function of potentials controlled by a Mach number servo and an altitude servo.

6. Control loading apparatus for a grounded flight trainer comprising in combination a simulated control member, a linkage connecting said member to hydraulic servo force-producing means through a force-to-electrical signal transducer to provide a first potential commensurate with force applied to said member, said force-to-electric signal transducer comprising a proving ring and differential transformer with said proving ring coupled to said transformer to mechanically alter the core and coil spatial relation of said transformer upon mechanical deformation of said proving ring, computer means for deriving further potentials commensurate with force acting upon a control member of an actual aircraft, means for summing said further potentials and comparing the sum of said further potentials with said first potential to provide an error potential, and means connecting said error potential to said force-producing servo means.

References Cited in the file of this patent
UNITED STATES PATENTS

| | | |
|---|---|---|
| 2,519,233 | Davis et al. | Aug. 15, 1950 |
| 2,554,155 | Rippere | May 22, 1951 |
| 2,627,675 | Kittredge | Feb. 10, 1953 |
| 2,695,145 | Lear et al. | Nov. 23, 1954 |
| 2,784,501 | Stern et al. | Mar. 12, 1957 |
| 2,804,698 | Grandmont | Sept. 3, 1957 |
| 2,808,659 | Dehmel | Oct. 8, 1957 |
| 2,851,795 | Sherman | Sept. 16, 1958 |
| 2,860,423 | Dehmel | Nov. 18, 1958 |

FOREIGN PATENTS

| | | |
|---|---|---|
| 1,102,320 | France | May 4, 1955 |
| 1,113,060 | France | Nov. 23, 1955 |